United States Patent
Choi et al.

(10) Patent No.: US 11,866,067 B2
(45) Date of Patent: Jan. 9, 2024

(54) SYSTEM AND METHOD FOR GENERATING AND CONTROLLING DRIVING PATHS IN AUTONOMOUS VEHICLE

(71) Applicant: Electronics and Telecommunications Research Institute, Daejeon (KR)

(72) Inventors: Doo Seop Choi, Daejeon (KR); Joo Young Kim, Daejeon (KR); Kyoung Wook Min, Daejeon (KR); Seung Jun Han, Daejeon (KR); Jeong Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 17/396,269

(22) Filed: Aug. 6, 2021

(65) Prior Publication Data

US 2022/0041180 A1 Feb. 10, 2022

(30) Foreign Application Priority Data

Aug. 7, 2020 (KR) .......................... 10-2020-0099527

(51) Int. Cl.
*B60W 60/00* (2020.01)
*B60W 40/105* (2012.01)
(Continued)

(52) U.S. Cl.
CPC ........ *B60W 60/0011* (2020.02); *B60W 10/20* (2013.01); *B60W 40/105* (2013.01);
(Continued)

(58) Field of Classification Search
CPC ............. B60W 60/0011; B60W 10/20; B60W 40/105; B60W 60/0015; B60W 2520/14; B60W 2520/16; B60W 2520/18; B60W 2540/18; B60W 2556/50; B60W 2556/60; B60W 60/001; B60W 30/10; B60W 40/02; B60W 40/10; B60W 50/10; B60W 2050/0005; B60W 2420/00; B60W 2520/10; B60W 2554/00; G06N 3/049; G06N 3/08; G06N 3/044; G06N 3/045; G05D 1/0214; G05D 1/0221; B60Y 2300/10
See application file for complete search history.

(56) References Cited

U.S. PATENT DOCUMENTS 10,106,153 B1 * 10/2018 Xiao ...................... G06F 18/24
10,235,885 B2    3/2019 An et al.
(Continued)

FOREIGN PATENT DOCUMENTS

JP    H0699830 A    4/1994
JP    2013225826 A   10/2013
(Continued)

*Primary Examiner* — Sze-Hon Kong
(74) *Attorney, Agent, or Firm* — William Park & Associates Ltd.

(57) ABSTRACT

Provided is a method of generating and controlling a driving path for an autonomous vehicle, the method including generating a driving path that matches a driving intention on the basis of sensing data acquired from a sensing module of the autonomous vehicle, determining steering angle information corresponding to the generated driving path, and controlling a steering angle of the autonomous vehicle.

17 Claims, 16 Drawing Sheets

(51) Int. Cl.
  *B60W 10/20* (2006.01)
  *G06N 3/049* (2023.01)
  *G06N 3/08* (2023.01)

(52) U.S. Cl.
  CPC ......... *B60W 60/0015* (2020.02); *G06N 3/049* (2013.01); *G06N 3/08* (2013.01); *B60W 2520/14* (2013.01); *B60W 2520/16* (2013.01); *B60W 2520/18* (2013.01); *B60W 2540/18* (2013.01); *B60W 2556/50* (2020.02); *B60W 2556/60* (2020.02)

(56) References Cited

U.S. PATENT DOCUMENTS

| | | | | |
|---|---|---|---|---|
| 10,981,564 | B2 * | 4/2021 | Herman | B60W 30/09 |
| 11,409,304 | B1 * | 8/2022 | Cai | B60W 60/001 |
| 11,531,346 | B2 * | 12/2022 | Marchetti-Bowick | G01C 21/3407 |
| 11,608,078 | B2 * | 3/2023 | He | B60W 60/001 |
| 2019/0146514 | A1 | 5/2019 | Son | |
| 2019/0164051 | A1 * | 5/2019 | Saleem | B60W 30/00 |
| 2019/0176818 | A1 * | 6/2019 | Movert | G06N 3/045 |
| 2020/0026283 | A1 * | 1/2020 | Barnes | G06V 20/58 |
| 2020/0089246 | A1 * | 3/2020 | McGill, Jr. | G05D 1/0214 |
| 2020/0151599 | A1 * | 5/2020 | Dey | G06N 7/01 |
| 2020/0174475 | A1 | 6/2020 | Min et al. | |
| 2021/0001884 | A1 * | 1/2021 | Alvarez | B60W 30/0953 |
| 2021/0201504 | A1 * | 7/2021 | Xu | G06V 10/82 |
| 2021/0334630 | A1 * | 10/2021 | Lambert | G05D 1/0088 |
| 2021/0383133 | A1 * | 12/2021 | Wang | G01S 7/40 |
| 2021/0403045 | A1 * | 12/2021 | Lin | B60W 60/0023 |
| 2022/0060641 | A1 * | 2/2022 | Herman | H04N 17/002 |

FOREIGN PATENT DOCUMENTS

| | | |
|---|---|---|
| JP | 2020026189 A | 2/2020 |
| KR | 1020180094725 A | 8/2018 |
| KR | 102015076 B1 | 8/2019 |
| KR | 102124384 B1 | 6/2020 |
| KR | 1020200093412 A | 8/2020 |
| WO | 2017057528 A1 | 4/2017 |

* cited by examiner

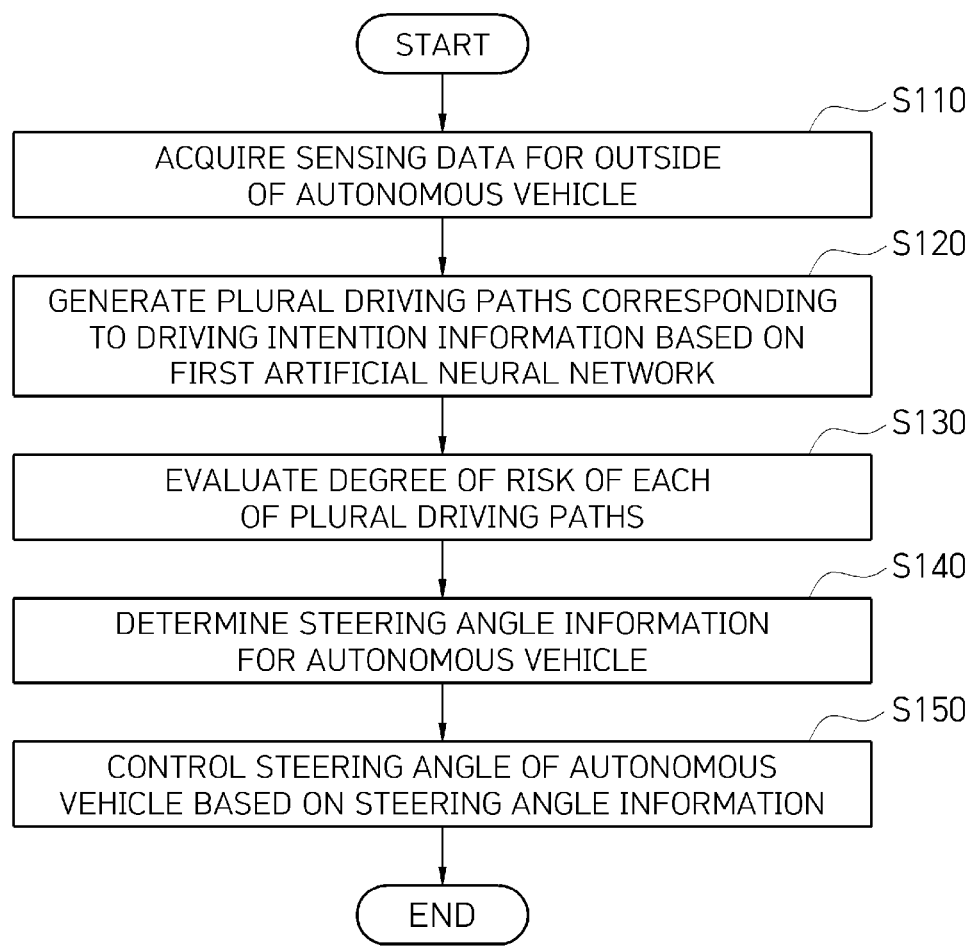

SYSTEM AND METHOD FOR GENERATING AND CONTROLLING DRIVING PATHS IN AUTONOMOUS VEHICLE

CROSS-REFERENCE TO RELATED APPLICATION

This application claims priority to and the benefit of Korean Patent Application No. 10-2020-0099527, filed on Aug. 7, 2020, the disclosure of which is incorporated herein by reference in its entirety.

BACKGROUND

1. Field of the Invention

The present invention relates to a system and method for generating and controlling a driving path in an autonomous vehicle, and more specifically, to a system and method for generating a path and steering angle information that match a driving intention on the basis of data sensed from a sensor module of an autonomous vehicle.

2. Discussion of Related Art

The existing automated driving systems (ADS) for an autonomous vehicle drive autonomous vehicles through a recognition process, an identification process, and a control process.

FIG. 1 is a diagram for describing the existing ADS.

First, in a recognition process (S10), static or dynamic objects around an autonomous vehicle are searched for and tracked using data acquired from a sensor module, such as a camera, a Light Detection and Ranging (Lidar), etc. In addition, lanes and surrounding buildings are recognized and compared with a high-definition (HD) map to predict the position and attitude of the autonomous vehicle.

Next, in an identification process (S20), a plurality of paths suitable for a driving intention are generated from the result of the recognition process, and the degree of risk of each path is determined to determine one path.

Next, in a control process (S30), the steering angle and speed of the autonomous vehicle are controlled such that the autonomous vehicle moves along the path generated in the identification process.

In this case, the related art is highly dependent on the HD map of the ADS, which acts as a limitation when the autonomous vehicle travels in various environments.

For example, in the case of a road with no lanes or newly drawn lanes, the related art has difficulty in predicting the position and attitude of an autonomous vehicle using an HD map in a recognition process and fails to generate a path using lanes in an identification process.

SUMMARY OF THE INVENTION

The present invention provides a system and method for generating and controlling a driving path in an autonomous vehicle that are capable of generating a driving path that matches a driving intention on the basis of sensing data acquired from a sensing module of an autonomous vehicle and determining steering angle information corresponding to the generated driving path to control the steering angle of the autonomous vehicle.

The technical objectives of the present invention are not limited to the above, and other objectives may become apparent to those of ordinary skill in the art based on the following description.

According to one aspect of the present invention, there is provided a method of generating and controlling a driving path in an autonomous vehicle, the method including: acquiring sensing data for an outside of the autonomous vehicle through at least one sensing module coupled to the autonomous vehicle; generating a plurality of driving paths corresponding to the driving intention information by using the sensing data, driving intention information, and target speed information as input data for a first artificial neural network; evaluating a degree of risk of each of the plurality of driving paths from object information recognized on the basis of the sensing information; determining steering angle information for the autonomous vehicle by using the driving path having a lowest degree of risk and the target speed information as input data for a second artificial neural network; and controlling a steering angle of the autonomous vehicle on the basis of the determined steering angle information, wherein the driving intention information is acquired from a driving path set from a navigation system linked with the autonomous vehicle.

The method may further include: collecting pieces of training-purpose sensing data for the first and second artificial neural networks during actual driving of a user from the sensing module of the autonomous vehicle or a learning data collecting vehicle; assigning each of the pieces of collected training-purpose sensing data with a corresponding piece of driving state information of the autonomous vehicle; constructing training data using each of the pieces of training-purpose sensing data assigned with the driving state information; and training the first and second artificial neural networks on the basis of the training data, wherein the training data includes the training-purpose sensing data, speed information, true value driving intention information, true value steering angle information, and actual path information for a time t.

The constructing of the training data using each piece of training-purpose sensing data assigned with the driving state information may include: calculating a transformation matrix using a yaw value, a pitch value, a roll value, a height value, and a latitude and longitude value of the autonomous vehicle or the learning data collecting vehicle acquired from the training-purpose sensing data; converting a global position of the autonomous vehicle or the learning data collecting vehicle after the time t into an egocentric coordinate system using the transformation matrix; and acquiring the actual path information on the basis of the converted egocentric coordinate system.

The constructing of the training data using each of the pieces of training-purpose sensing assigned with the driving state information may include, for each position in the actual path information, detecting a corresponding shortest position for the autonomous vehicle or the learning data collecting vehicle in each piece of the training-purpose sensing data assigned with the driving state information, acquiring the driving state information corresponding to the detected position as the driving intention information in the actual path information, and selecting the true value driving intention information that represents the actual path information among pieces of driving intention information of the actual path information.

The selecting of the true value driving intention information that represents the actual path information among the pieces of driving intention information of the actual path information may include selecting a maximum number of pieces of driving intention information among L pieces of driving intention information in the actual path information or driving intention information at a last position as the true value driving intention information.

The driving state information may include information corresponding to the driving intention information, and the driving intention information and the driving state information may include one of straight driving, a left turn, a right turn, a U-turn, a lane change to left, a lane change to right, avoidance, a left direction, and a right direction.

The method may further include, when the sensing module configured to sense the training data includes a plurality of sensing modules, performing time-series synchronization on the training-purpose sensing data acquired from each of the plurality of sensing modules.

The training of the first and second artificial neural networks on the basis of the training data may include training the first artificial neural network to reduce an error between a plurality of driving paths, which are pieces of output data of the first artificial neural network, and the actual path information.

The training of the first and second artificial neural networks on the basis of the training data may include setting the target speed information as an initial hidden state vector of the second artificial neural network based on a recurrent neural network (RNN), sequentially inputting each position in the actual path information and a hidden state vector corresponding to each position to the second artificial neural network, acquiring a hidden state vector at an end of the second artificial neural network as steering angle information, and training the second artificial neural network to reduce an error between the acquired steering angle information and the true value steering angle information.

The generating of the plurality of driving paths corresponding to the driving intention information may include extracting a feature vector using the sensing data as input data of a convolution neural network (CNN)-based feature extraction algorithm, and while using the feature vector, the target speed information, the driving intention information, and a noise vector as input data of a recurrent neural network (RNN)-based path generation algorithm, repeatedly varying the noise vector to generate the plurality of driving paths.

The repeatedly varying of the noise vector to generate the plurality of driving paths may include inputting a $1^{st}$ position in a driving path and a hidden state vector corresponding to the $1^{st}$ position as input data of the RNN-based path generation algorithm, acquiring an $I+1^{st}$ position in the driving path on the basis of an $I+1^{st}$ hidden state vector acquired as an output for the input and the feature vector, and repeatedly varying the noise vector with respect to the driving path to generate the plurality of driving paths.

According to another aspect of the present invention, there is provided a system for generating and controlling a driving path in an autonomous vehicle, the system including at least one sensing module coupled to the autonomous vehicle and configured to acquire sensing data for an outside of the autonomous vehicle a memory in which a program for generating a plurality of driving paths for the autonomous vehicle on the basis of the sensing data and determining steering angle information corresponding to one of the generated plurality of driving paths is stored, and a processor configured to execute the program stored in the memory, wherein the processor executes the program to: use the sensing data, driving intention information set from a navigation system linked with the autonomous vehicle, and target speed information as input data for a first artificial neural network to generate a plurality of driving paths corresponding to the driving intention information; and evaluate a degree of risk of each of the plurality of driving paths from object information recognized on the basis of the sensing information; and use the driving path having a lowest degree of risk and the target speed information as input data for a second artificial neural network to determine steering angle information for the autonomous vehicle to control a steering angle of the autonomous vehicle.

The processor may be configured to: extract a feature vector by using the sensing data as input data of a convolution neural network (CNN)-based feature extraction algorithm and, while using the feature vector, the target speed information, the driving intention information, and a noise vector as input data of a recurrent neural network (RNN)-based path generation algorithm, repeatedly vary the noise vector to generate the plurality of driving paths.

The processor may be configured to input a $1^{st}$ position in a driving path and a hidden state vector corresponding to the $1^{st}$ position as input data of the RNN-based path generation algorithm, acquire an $I+1^{st}$ position in the driving path on the basis of an $I+1^{st}$ hidden state vector acquired as an output for the input and the feature vector, and repeatedly vary the noise vector with respect to the driving path to generate the plurality of driving paths.

The processor may be configured to collect pieces of training-purpose sensing data for the first and second artificial neural networks during actual driving of a user from the sensing module of the autonomous vehicle or a learning data collecting vehicle, assign each of the pieces of collected training-purpose sensing data with a corresponding piece of driving state information of the autonomous vehicle, construct training data using each of the pieces of training-purpose sensing data assigned with the driving state information and train the first and second artificial neural networks on the basis of the training data, wherein the training data may include the training-purpose sensing data, speed information, true value driving intention information, true value steering angle information, and actual path information for a time t.

The processor may be configured to: calculate a transformation matrix using a yaw value, a pitch value, a roll value, a height value, and a latitude and longitude value of the autonomous vehicle or the learning data collecting vehicle acquired from the training-purpose sensing data; convert a global position of the autonomous vehicle or the learning data collecting vehicle after the time t into an egocentric coordinate system using the transformation matrix; and acquire the actual path information on the basis of the converted egocentric coordinate system.

The processor may be configured to, for each position in the actual path information, detect a corresponding shortest position for the autonomous vehicle or the learning data collecting vehicle in each piece of the training-purpose sensing data assigned with the driving state information, acquire the driving state information corresponding to the detected position as the driving intention information in the actual path information, and select the true value driving intention information that represents the actual path information among pieces of driving intention information of the actual path information.

The processor may be configured to select a maximum number of pieces of driving intention information among L pieces of driving intention information in the actual path information or driving intention information at a last position as the true value driving intention information.

The processor may be configured to: train the first artificial neural network to reduce an error between a plurality of driving paths, which are pieces of output data of the first artificial neural network, and the actual path information;

and set the target speed information as an initial hidden state vector of the second artificial neural network based on a recurrent neural network (RNN), sequentially input each position in the actual path information and a hidden state vector corresponding to each position to the second artificial neural network, acquire a hidden state vector at an end of the second artificial neural network as steering angle information, and train the second artificial neural network to reduce an error between the acquired steering angle information and the true value steering angle information.

In addition, other methods and other systems for implementing the present invention, and a computer readable recoding medium that records a computer program for executing the method may be further provided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a flowchart showing a method of generating and controlling a driving path according to an embodiment of the present invention;

DETAILED DESCRIPTION OF EXEMPLARY EMBODIMENTS

Figure 1:
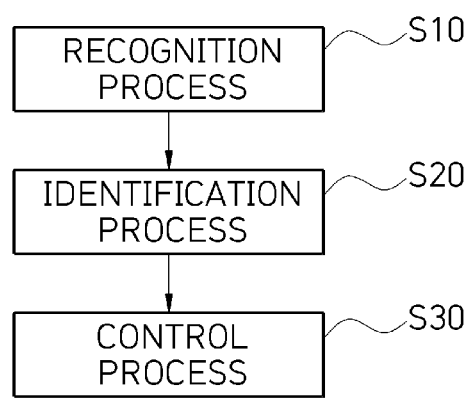
FIG. 1 is a diagram for describing an existing automated driving system (ADS)

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to assist those of ordinary skill in the art in fully understanding the scope of the present invention, and the scope of the present invention is defined only by the appended claims.

Terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used to designate the same elements through the whole specification, and the term "and/or" includes any one or combinations of the associated listed items. It should be understood that, although the terms "first," "second," etc. may be used herein to describe various elements, these elements are not limited by these terms. These terms are only used to distinguish one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly so defined herein.

Hereinafter, a method performed by a system 100 for generating and controlling a driving path for an autonomous vehicle according to an embodiment of the present invention will be described with reference to FIGS. 2 to 14.

FIG. 2 is a flowchart showing a method of generating and controlling a driving path according to an embodiment of the present invention.

First, sensing data for the outside of an autonomous vehicle is acquired through at least one sensing module coupled to the autonomous vehicle (S110).

In an embodiment, the sensing module may include at least one stereo camera, a Lidar, a radar, a global positioning system (GPS), an inertial measuring unit (IMU), and the like, and the sensing data refers to raw data acquired through such a sensing module.

The sensing module may sense the external environment of the autonomous vehicle. For example, the sensing module may sense moving objects on a sidewalk or roadway, such as a preceding/following vehicle, a vehicle on the next lane, people, and bikes, or stationary objects, such as lanes, buildings, traffic lights, and pedestrian crossings. The sensing data through the sensing module is processed into object information through a separate recognition process. For example, through a recognition process, a moving or fixed object may be recognized or a relative distance between objects, a drivable area, etc. may be acquired as object information.

Next, the sensing data through the sensing module, driving intention information, and target speed information are used as input data of a first artificial neural network to generate a plurality of driving paths corresponding to the driving intention information (S120).

Here, the driving intention information is declared as one of straight driving, a left turn, a right turn, a U-turn, a lane change to the left, a lane change to the right, avoidance, a left direction, and a right direction and is acquired from a driving path set from a navigation system linked to the autonomous vehicle. Alternatively, the driving intention information and the target speed information may be directly input by a user through the navigation system or other various interfaces in the autonomous vehicle.

FIG. 3 shows diagrams for describing a driving path generated by the first artificial neural network. FIG. 4 shows diagrams illustrating an example of a plurality of the driving paths generated by the first artificial neural network.

Figure 3A:
FIGS. 3A and 3B show diagrams for describing a driving path generated by a first artificial neural network.
Figure 3B:
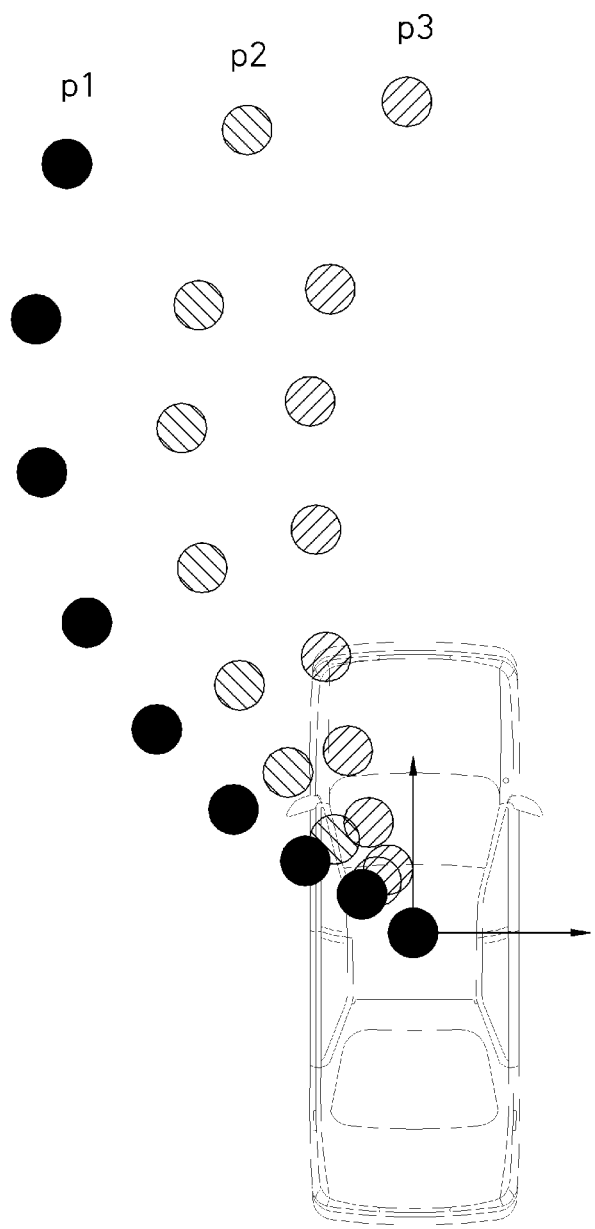
Figure 4A:
FIGS. 4A, 4B, and 4C show diagrams illustrating an example of a plurality of the driving paths generated by the first artificial neural network.
Figure 4B:
Figure 4C:

By defining that the sensing data, which is raw data acquired from the sensing module, is I, the driving intention information is a, the target speed information is s, and the driving path of a $k^{th}$ vehicle is $p^k=[p_1, p_2, \ldots, $ and $p_L]$ and setting I, a, s, and $p^k=[p_1, p_2, \ldots, $ and $p_L]$ as inputs and an output of the first artificial neural network as shown in FIG. 3A, the first artificial neural network generates a number of driving paths corresponding to the driving intention information as shown in FIG. 3B. In this case, FIG. 3B shows the generated three driving paths in an egocentric coordinate system.

Referring to FIG. 4, a red line represents an actual driving path of the autonomous vehicle, and a blue path, a yellow path, a green path, and a sky-blue path each represent a number of driving paths generated for each piece of driving intention information of "straight driving," "left turn," "right turn," and "U-turn."

As shown in FIG. 4, it can be seen that when the first artificial neural network is used, a path that is highly similar to the actually driven path is generated and various paths having the same driving intention may be generated.

On the other hand, the structure of the first artificial neural network and details of training the same will be described below.

Next, the degree of risk of each of the plurality of driving paths is evaluated from the object information recognized on the basis of the sensing data (S130), and the driving path with the lowest degree of risk and the target speed information are used as input data of a second artificial neural network to determine steering angle information for the autonomous vehicle (S140). When the steering angle information is determined as described above, the actual steering angle of the autonomous vehicle is controlled on the basis of the determined steering angle information (S150).

Figure 5:
FIG. 5 is a diagram for describing a second artificial neural network.

FIG. 5 is a diagram for describing the second artificial neural network.

When a driving path P* with the lowest degree of risk is selected among the plurality of driving paths, the selected driving path P* and target speed information s are set as input data of the second artificial neural network to acquire steering angle information SA for the autonomous vehicle.

The steering angle information SA is a value for controlling a steering wheel of an actual vehicle and may be expressed as an angle or a value between −1 and 1. The structure of the second artificial neural network for determining steering angle information and details of training the same will be described below.

Hereinafter, a method of constructing training data for training the first and second artificial neural networks will be described, and then a method of training the first and second artificial neural networks on the basis of the training data will be described.

Figure 6:
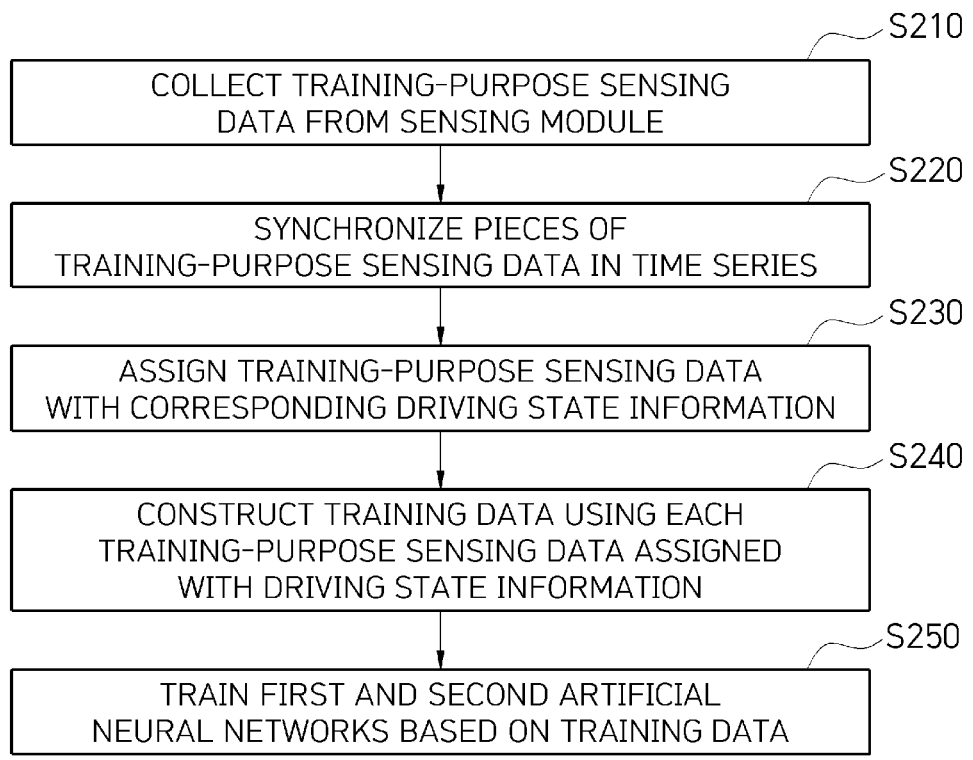
FIG. 6 is a flowchart for describing a process of training the first and second artificial neural networks.

FIG. 6 is a flowchart for describing a process of training the first and second artificial neural networks.

First, training-purpose sensing data for training the first and second artificial neural networks is collected during actual driving by the user (S210).

The training-purpose sensing data for generating training data may be acquired from a sensing module of the autonomous vehicle or may be separately acquired from a sensing module of a training data collecting vehicle. Such training-purpose sensing data is data acquired in real time during actual driving by a user, rather than during autonomous driving.

In an embodiment, when a plurality of sensing modules for sensing training-purpose sensing data exist, pieces of training-purpose sensing data acquired from the plurality of sensing modules may be synchronized in time series (S220).

FIG. 7 shows diagrams for describing an example of synchronizing training-purpose sensing data.

Figure 7A:
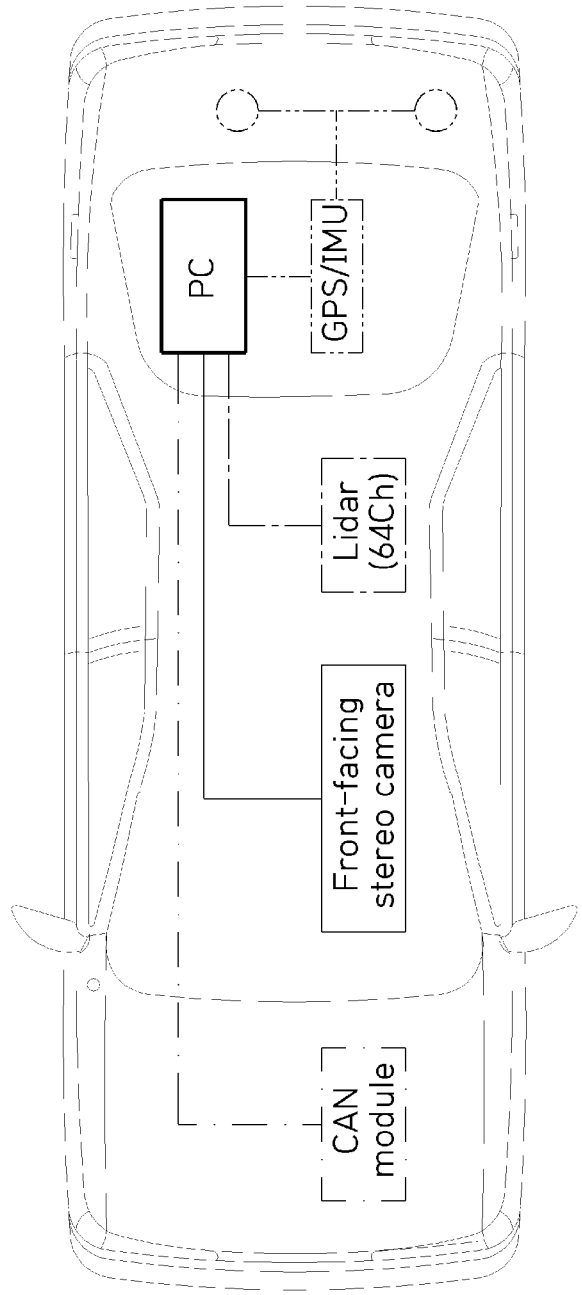
FIGS. 7A and 7B show diagrams for describing an example of synchronizing training-purpose sensing data.
Figure 7B:
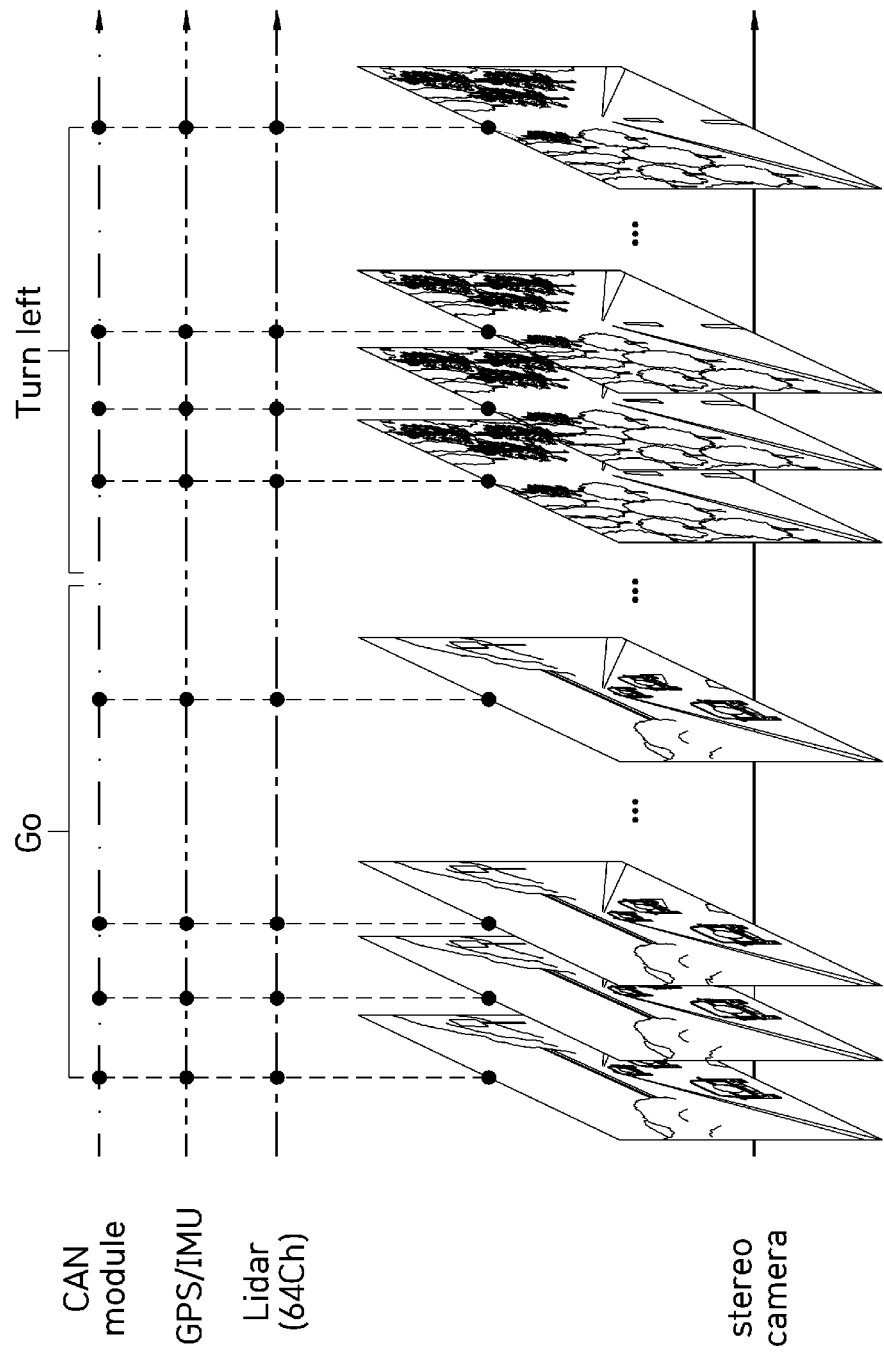

As an example, when a stereo camera, a 64ch Lidar, a GPS, an IMU, and a controller area network (CAN) module are included as sensing modules in an autonomous vehicle or a training data collecting vehicle as shown in FIG. 7A, a plurality of pieces of training-purpose sensing data acquired from the sensing modules may be synchronized in time series as shown in FIG. 7B.

Next, each piece of the collected training-purpose sensing data is assigned with a corresponding piece of driving state information in the autonomous vehicle (S230).

The driving state information may be one of straight driving, a left turn, a right turn, a U-turn, a lane change to the left, a lane change to the right, avoidance, a left direction, and a right direction similar to the driving intention information.

The driving state information may be assigned to correspond to a single piece of training-purpose sensing data or each piece of synchronized training-purpose sensing data as shown in FIG. 7B. For example, the driving state information may be assigned after the user checks an actual driving image and training-purpose sensing data.

Next, training data for training the first and second artificial neural networks is constructed using the training-purpose sensing data to which the driving state information is assigned (S240).

In one embodiment, the training data includes training-purpose sensing data I for a time t, speed information s for a time t, true value driving intention information a for a time t, true value steering angle information SA at a time t, and actual path information $P^{gt}$ after a time t. That is, the training data may be composed of a data-true value pair such as (I, a, s, $P^{gt}$, SA).

A method of acquiring the actual path information $P^{gt}$ and the true value driving intention information a using the training-purpose sensing data is as follows.

Figure 8:
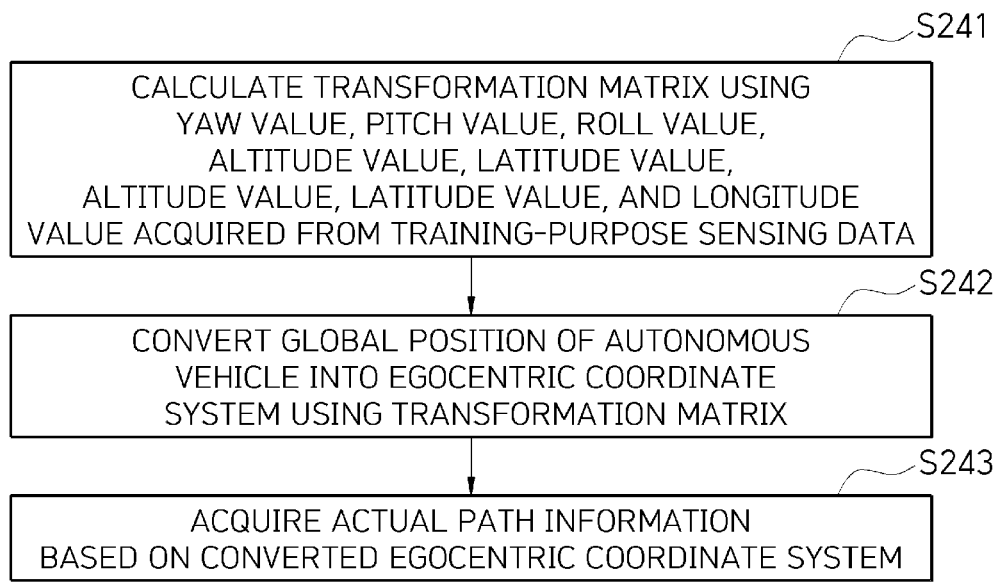
FIG. 8 is a flowchart for describing details of acquiring actual path information.
Figure 9:
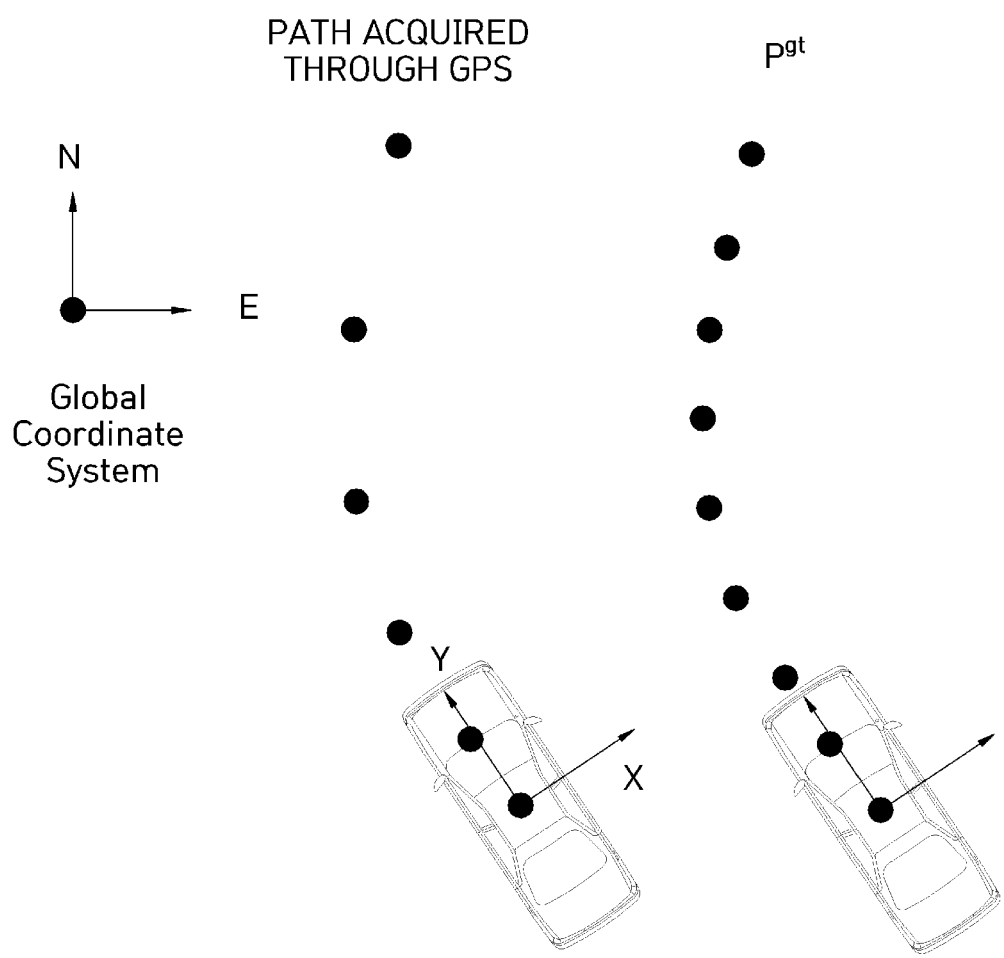
FIG. 9 is a diagram illustrating an example of acquiring actual path information.

FIG. 8 is a flowchart for describing details of acquiring actual path information. FIG. 9 is a diagram illustrating an example of acquiring actual path information.

First, a transformation matrix M is calculated using a yaw value, a pitch value, a roll value, an altitude value, a latitude value, and a longitude value of the autonomous vehicle or the training data collecting vehicle acquired from training-purpose sensing data at a time t (S241).

Then, a GPS based global position of the autonomous vehicle or the training data collecting vehicle after a time t is converted into an egocentric coordinate system using the transformation matrix M (S242).

Then, the actual path information $P^{gt}$ is acquired as shown in FIG. 9 on the basis of the converted egocentric coordinate system (S243).

Figure 10:
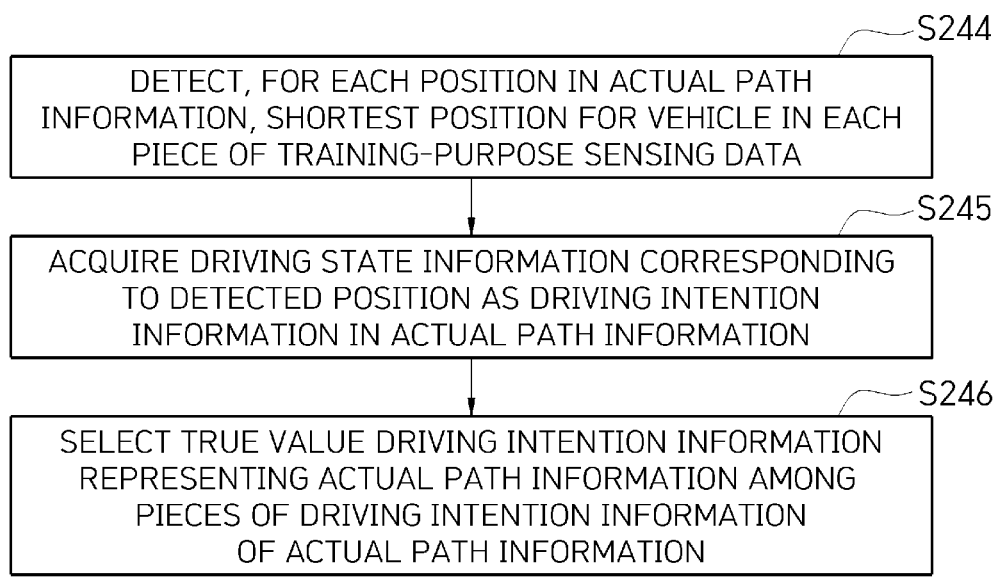
FIG. 10 is a flowchart for describing details of acquiring true value driving intention information.
Figure 11:
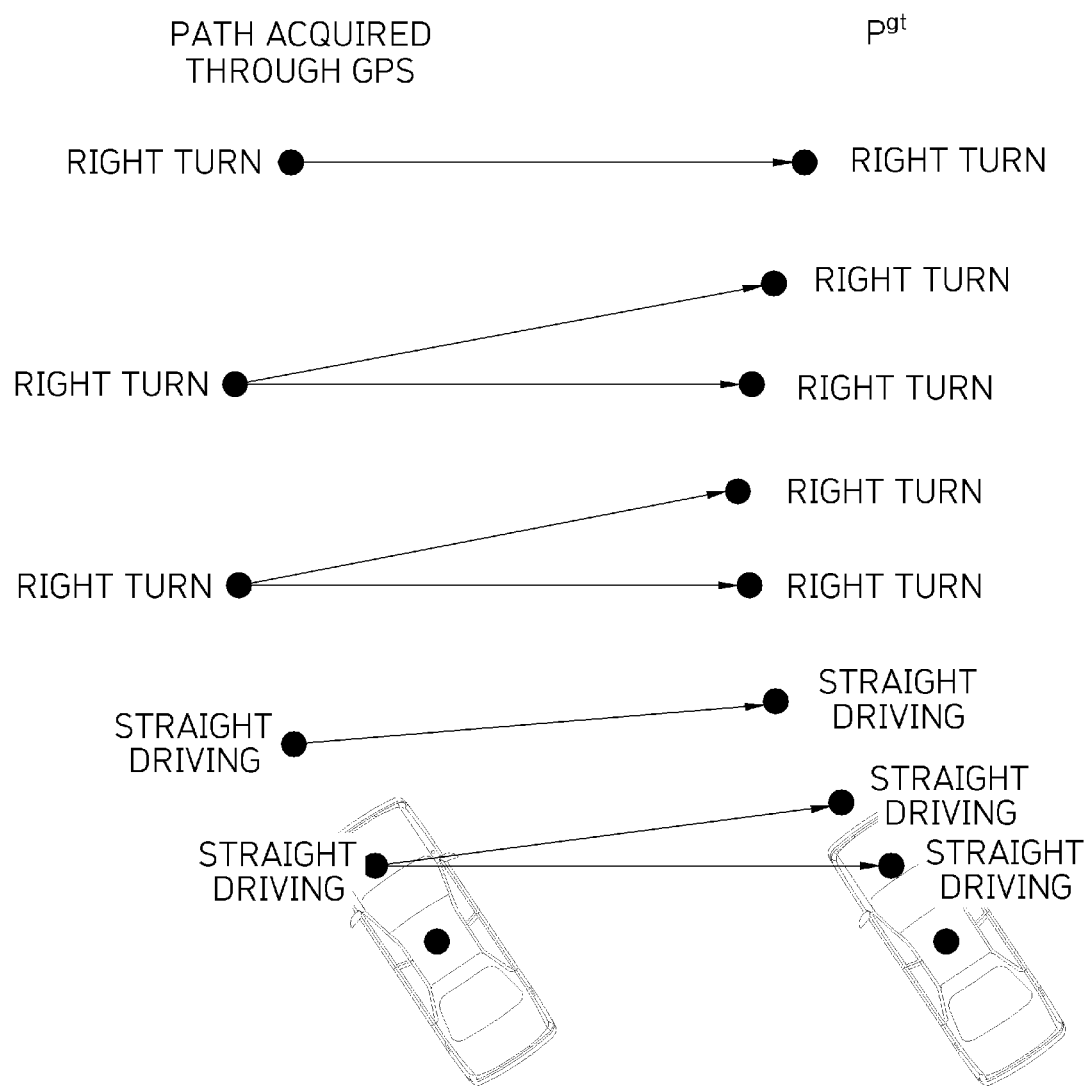
FIG. 11 is a diagram illustrating an example of acquiring true value driving intention information.

FIG. 10 is a flowchart for describing details of acquiring true value driving intention information. FIG. 11 is a diagram illustrating an example of acquiring true value driving intention information.

In order to acquire the true value driving intention information a, first, for each position in the actual path information $P^{gt}$, the corresponding shortest position for the autonomous vehicle or the training data collecting vehicle in each piece of training-purpose sensing data assigned with driving state information is detected (S244).

As described above, since training-purpose sensing data is assigned with a corresponding piece of driving state information, each position of a path acquired through the GPS is identified with a corresponding piece of driving state information as shown in FIG. 11. By using the driving state information, for each position of the actual path information $P^{gt}$, the closest position among the positions in the path acquired through GPS is detected.

Next, driving state information corresponding to the detected position is acquired as driving intention information in the actual path information (S245). For example, when the actual path information $P^{gt}$ is a path defined by L positions, L pieces of driving intention information may exist to correspond to the respective positions of the actual path information $P^{gt}$.

Next, among the pieces of driving intention information of the actual path information $P^{gt}$, true value driving intention information a representing the actual path information P is selected (S246).

That is, one true value driving intention information a representing the actual path information $P^{gt}$ is selected using the L pieces of driving intention information.

In an embodiment, the true value driving intention information a may be the maximum number of pieces of driving intention information among the L pieces of driving intention information in the actual path information. Alternatively, the driving intention information at the last position in the actual path information may be selected as the true value driving intention information a. The method of selecting the true value driving intention information a is not limited thereto and may be implemented according to various embodiments.

When the training data is constructed as such, the first and second artificial neural networks are trained on the basis of the training data (S250).

In an embodiment, the first artificial neural network may be trained to reduce an error between a plurality of driving paths that are output data of the first artificial neural network and actual path information.

That is, each parameter in the first artificial neural network is trained using I, a, s, $P^{gt}$, and SA of the training data such that an error between the output of the first artificial neural network and the actual path information $P^{gt}$ is reduced.

In addition, according to an embodiment of the present invention, a generative adversarial network (GAN) framework may be additionally used for the training such that a plurality of driving paths, which are output data of the first artificial neural network, match the actual path information more. For example, a discriminator to distinguish whether a path received as an input is actual path information may be constructed, and training may be performed to distinguish a driving path, which is output data through the first artificial neural network, from an actual path.

In addition, according to an embodiment of the present invention, the training may be performed such that a discriminator predicts driving intention information of a path that is received as an input of the first artificial neural network.

On the other hand, in an embodiment of the present invention, the first artificial neural network may be trained such that a discriminator recognizes a driving path (which is the first artificial neural network) as an actual path, and at the same time, identify driving intention information of the driving path, which is output data of the first artificial neural network).

The first artificial neural network trained according to the method outputs a plurality of driving paths P by using sensing data I, target speed information s, driving intention information a, and noise vector z as an input. In this case, the first artificial neural network may generate the plurality of driving paths by repeatedly varying the noise vector z.

Figure 12A:
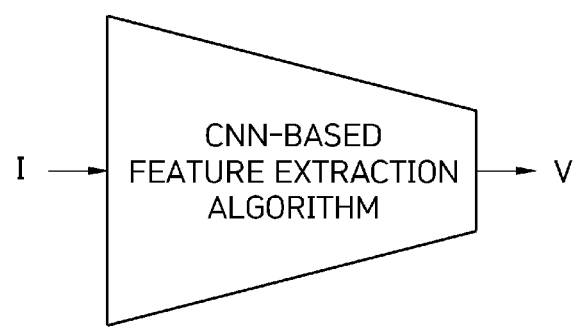
FIGS. 12A, 12B and 13 are diagrams for describing the first artificial neural network.
Figure 12B:
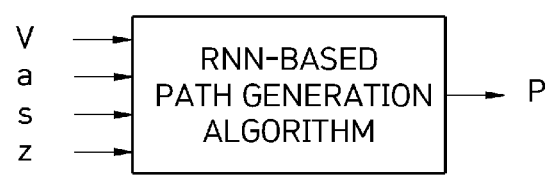
Figure 13:
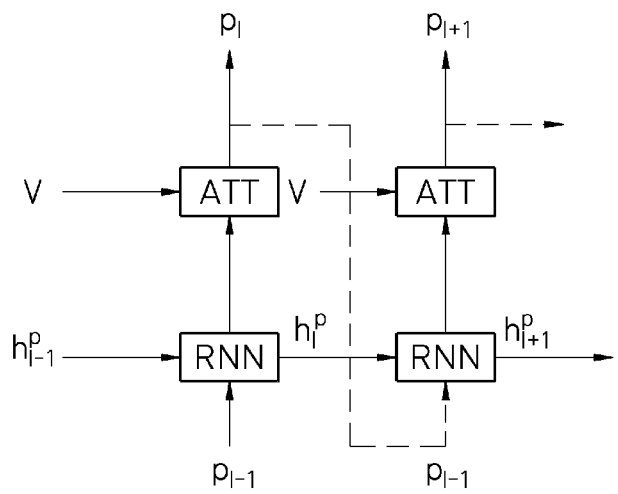

FIGS. 12A, 12B and 13 are diagrams for describing the first artificial neural network.

In an embodiment, the first artificial neural network may include a convolution neural network (CNN)-based feature extraction algorithm (a feature extraction network, FEN) and a recurrent neural network (RNN)-based path generation algorithm (a path generation network, PGN).

First, referring to FIG. 12A, sensing data is used as input data of a CNN-based FEN of the first artificial neural network to extract a feature vector v.

Next, referring to FIG. 12B, the feature vector v, the target speed information s, the driving intention information a, and the noise vector z are used as input data of the RNN-based PGN to generate a path P that matches the driving intention information a. In this case, according to an embodiment of the present invention, a plurality of driving paths having the same driving intention information a may be generated by repeatedly varying the noise vector z.

FIG. 13 illustrates the RNN-based PGN of the first artificial neural network.

Referring to FIG. 13, in order to calculate a $1^{st}$ position $p_l$ in a driving path P, a previous position $p_{l-1}$ and a hidden state vector $h^p_{l-1}$ corresponding to a $1-1^{st}$ position that is the previous position are input as input data of the RNN-based PGN.

Then, the RNN-based PGN outputs a new hidden state vector $h^p_l$ for the input and performs an attention operation (ATT) using the feature vector v acquired through the CNN-based FEN to thereby acquire the $1^{st}$ position $p_l$ in the driving path P.

Similarly, when the above-described process is performed in the same manner using $h^p_l$ and $p_l$, a $l+1^{st}$ position $p_{l+1}$ may be acquired. In this case, the driving intention information a, the target speed information s, and the noise vector z may be transmitted in the form of an initial input value $p_0$ of the RNN-based PGN or an initial hidden state $h^p_0$.

Figure 14:
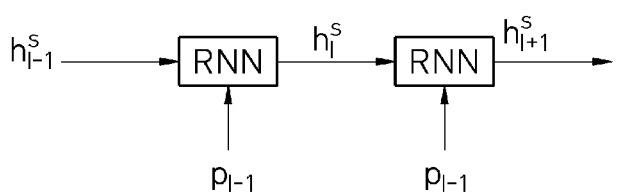
FIG. 14 is a diagram for describing the second artificial neural network.

FIG. 14 is a diagram for describing the second artificial neural network.

In an embodiment, the second artificial neural network may be configured as an RNN.

According to an embodiment of the present invention, in order to train the second artificial neural network, first, the target speed information s is set as an initial hidden state vector h_L^0 of the second RNN-based artificial neural network.

Then, each position in the actual path information and a hidden state vector corresponding to each position is sequentially input to the second artificial neural network, and accordingly, a hidden state vector $h^s_L$ at the end of the second artificial neural network is acquired as steering angle information.

Then, the second artificial neural network may be trained such that an error between the acquired steering angle information and the true value steering angle information in the training data acquired from actual driving is reduced.

On the other hand, operations S110 to S250 described above may be further divided into additional operations or may be combined into fewer operations according to embodiments. In addition, some operations may be omitted if required, and the order thereof may be switched. In addition, content described in FIGS. 1 to 14 that is omitted in FIG. 15 may be applied to the system 100 for generating and controlling a driving path for an autonomous vehicle.

Hereinafter, the system 100 for generating and controlling a driving path for an autonomous vehicle (hereinafter referred to as a driving path generation and control system) according to the embodiment will be described with reference to FIG. 15.

Figure 15:
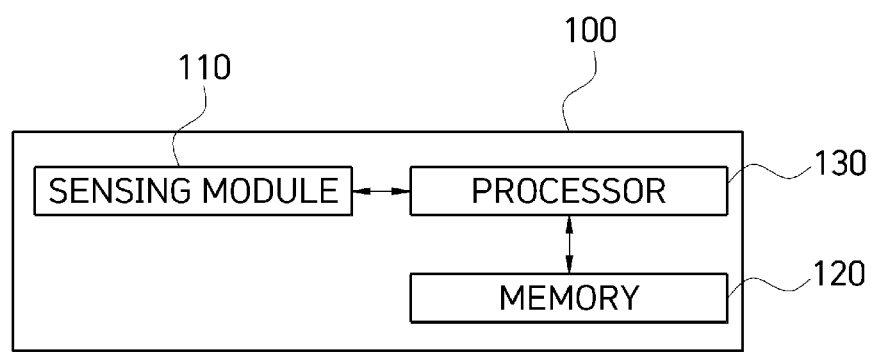
FIG. 15 is a diagram for describing a system for generating and controlling a driving path according to an embodiment of the present invention.

FIG. 15 is a diagram for describing the driving path generation and control system 100 for generating and controlling a driving path according to an embodiment of the present invention.

The driving path generation and control system 100 according to the embodiment of the present invention includes at least one sensing module 110, a memory 120, and a processor 130.

The sensing module 110 is coupled to the autonomous vehicle and acquires sensing data for the outside of the autonomous vehicle.

In the memory 120, a program for generating a plurality of driving paths for the autonomous vehicle on the basis of the sensing data acquired from the sensing module 110 and determining steering angle information corresponding to one of the generated plurality of driving paths is stored.

Here, the memory 120 collectively refers to a nonvolatile storage device, which keeps stored information even when power is not supplied, and a volatile storage device. For example, the memory may include a NAND flash memory such as a compact flash (CF) card, a secure digital (SD) card, a memory stick, a solid-state drive (SSD), and a micro-SD card, a magnetic computer storage device such as a hard disk drive (HDD), and an optical disc drive such as a compact disc read only memory (CD-ROM) and a digital versatile disc (DVD)-ROM.

The processor 130 executes the program stored in the memory 120 to set the sensing data, driving intention information, and target speed information set as input data of the first artificial neural network so as to generate a plurality of driving paths corresponding to the driving intention information.

Further, the processor 130 evaluates the degree of risk of each of the plurality of driving paths from object information recognized on the basis of the sensing information, determines steering angle information of the autonomous vehicle by using a driving path having the lowest degree of risk and the target speed information as input for the second artificial neural network, and controls the steering angle of the autonomous vehicle on the basis of the determined steering angle information.

The method of generating and controlling a driving path of an autonomous vehicle according to the above-described embodiment of the present invention may be implemented as a program (or an application) to be executed in combination with a server, which is hardware, and stored in a medium.

The program may include codes coded in a computer language C, C++, Java, other machine language, etc., that can be read by a processor (a central processing unit (CPU) of a computer through a device interface of the computer in order for the computer to read the program and execute the methods implemented as the program. The code may include a functional code that is related to a function that defines functions needed to execute the methods and may include an execution procedure related control code needed to cause the processor of the computer to execute the functions according to a predetermined procedure. In addition, the code may further include a memory reference related code as to whether additional information or media needed to cause the processor of the computer to execute the functions should be referred to at a location (an address) of an internal or external memory of the computer. In addition, when the processor of the computer needs to communicate with any other computers or servers, etc. at a remote site, to perform the above-described functions, the code may further include communication related codes such as how to communicate with any other computers or servers at a remote site and what information or media should be transmitted or received during communication.

The storage medium does not refer to a medium that stores data for a short period of time, such as a register, cache, memory, etc., but refers to a medium that stores data semi-permanently and can be read by a device. Specifically, examples of the storage medium include may include a read-only memory (ROM), a random-access memory (RAM), a compact disc (CD)-ROM, a magnetic tape, a floppy disk, an optical data storage device, etc., but are not limited thereto. That is, the program may be stored in various recording media on various servers which the computer can access or on various recording media on the computer of the user. In addition, the medium may be distributed over computer systems connected through a network so that computer-readable codes may be stored in a distributed manner.

The operations of the method or algorithm described in connection with the embodiment of the present invention may be implemented directly in hardware, implemented in a software module executed by hardware, or a combination thereof. Software modules may reside in a RAM, a ROM, an Erasable Programmable ROM (EPROM), an Electrically Erasable Programmable ROM (EEPROM), a flash memory, a hard disk, a removable disk, a CD-ROM, or any other form of computer-readable recording medium known in the art to which the present invention pertains.

As is apparent from the above, the autonomous vehicle can be controlled by generating a driving path and a steering angle that match driving intention information without an HD map.

Accordingly, autonomous driving can be performed in various environments such as a road without lanes.

It should be understood that the effects of the present disclosure are not limited to the above effects and include all effects that can be deduced from the detailed description of the present disclosure or the configuration of the present disclosure described in the claims.

Although the present invention has been described in detail above with reference to the exemplary embodiments, those of ordinary skill in the technical field to which the present invention pertains should be able to understand that various modifications and alterations may be made without departing from the technical spirit or essential features of the present invention. Therefore, it should be understood that the disclosed embodiments are not limiting but illustrative in all aspects.

What is claimed is:

1. A method of generating and controlling a driving path in an autonomous vehicle, the method comprising:
   acquiring sensing data for an outside of the autonomous vehicle through at least one sensing module coupled to the autonomous vehicle;
   generating a plurality of driving paths corresponding to the driving intention information by using the sensing data, driving intention information, and target speed information as input data for a first artificial neural network;
   evaluating a degree of risk of each of the plurality of driving paths from object information recognized on the basis of the sensing information;
   determining steering angle information for the autonomous vehicle by using the driving path having a lowest degree of risk and the target speed information as input data for a second artificial neural network; and
   controlling a steering angle of the autonomous vehicle on the basis of the determined steering angle information,
   wherein the generating of the plurality of driving paths corresponding to the driving intention information includes:
   extracting a feature vector using the sensing data as input data of a convolution neural network (CNN)-based feature extraction algorithm; and
   while using the feature vector, the target speed information, the driving intention information, and a noise vector as input data of a recurrent neural network (RNN)-based path generation algorithm, repeatedly varying the noise vector to generate the plurality of driving paths.

2. The method of claim 1, further comprising:
   collecting pieces of training-purpose sensing data for the first and second artificial neural networks during actual driving of a user from the at least one sensing module of the autonomous vehicle or a learning data collecting vehicle;
   assigning each of the pieces of collected training-purpose sensing data with a corresponding piece of driving state information of the autonomous vehicle;
   constructing training data using each of the pieces of training-purpose sensing data assigned with the driving state information; and
   training the first and second artificial neural networks on the basis of the training data,
   wherein the training data includes the training-purpose sensing data, speed information, true value driving intention information, true value steering angle information, and actual path information for a time t.

3. The method of claim 2, wherein the constructing of the training data using each piece of training-purpose sensing data assigned with the driving state information includes:
   calculating a transformation matrix using a yaw value, a pitch value, a roll value, a height value, and a latitude and longitude value of the autonomous vehicle or the learning data collecting vehicle acquired from the training-purpose sensing data;
   converting a global position of the autonomous vehicle or the learning data collecting vehicle after the time t into an egocentric coordinate system using the transformation matrix; and
   acquiring the actual path information on the basis of the converted egocentric coordinate system.

4. The method of claim 3, wherein the constructing of the training data using each of the pieces of training-purpose sensing assigned with the driving state information includes:
   for each position in the actual path information, detecting a corresponding shortest position for the autonomous vehicle or the learning data collecting vehicle in each piece of the training-purpose sensing data assigned with the driving state information;
   acquiring the driving state information corresponding to the detected position as the driving intention information in the actual path information; and
   selecting the true value driving intention information that represents the actual path information among pieces of driving intention information of the actual path information.

5. The method of claim 4, wherein the selecting of the true value driving intention information that represents the actual path information among the pieces of driving intention information of the actual path information includes:
   selecting a maximum number of pieces of driving intention information among L pieces of driving intention information in the actual path information or driving intention information at a last position as the true value driving intention information.

6. The method of claim 2, wherein the driving state information includes information corresponding to the driving intention information, and
   the driving intention information and the driving state information include one of straight driving, a left turn, a right turn, a U-turn, a lane change to left, a lane change to right, avoidance, a left direction, and a right direction.

7. The method of claim 2, further comprising, wherein the at least one sensing module configured to sense the training data includes a plurality of sensing modules, performing time-series synchronization on the training-purpose sensing data acquired from each of the plurality of sensing modules.

8. The method of claim 2, wherein the training of the first and second artificial neural networks on the basis of the training data includes training the first artificial neural network to reduce an error between a plurality of driving paths, which are pieces of output data of the first artificial neural network, and the actual path information.

9. The method of claim 2, wherein the training of the first and second artificial neural networks on the basis of the training data includes:
   setting the target speed information as an initial hidden state vector of the second artificial neural network based on a recurrent neural network (RNN);
   sequentially inputting each position in the actual path information and a hidden state vector corresponding to each position to the second artificial neural network;
   acquiring a hidden state vector at an end of the second artificial neural network as steering angle information; and
   training the second artificial neural network to reduce an error between the acquired steering angle information and the true value steering angle information.

10. The method of claim 1, wherein the repeatedly varying of the noise vector to generate the plurality of driving paths includes:
    inputting a $I^{st}$ position in a driving path and a hidden state vector corresponding to the $I^{st}$ position as input data of the RNN-based path generation algorithm;
    acquiring an $I+1^{st}$ position in the driving path on the basis of an $I+1^{st}$ hidden state vector acquired as an output for the input and the feature vector; and
    repeatedly varying the noise vector with respect to the driving path to generate the plurality of driving paths.

11. A system for generating and controlling a driving path in an autonomous vehicle, the system comprising:
- at least one sensing module coupled to the autonomous vehicle and configured to acquire sensing data for an outside of the autonomous vehicle;
- a memory in which a program for generating a plurality of driving paths for the autonomous vehicle on the basis of the sensing data and determining steering angle information corresponding to one of the generated plurality of driving paths is stored; and
- a processor configured to execute the program stored in the memory,
- wherein the processor executes the program to:
- use the sensing data, driving intention information set and target speed information as input data for a first artificial neural network to generate a plurality of driving paths corresponding to the driving intention information; and
- evaluate a degree of risk of each of the plurality of driving paths from object information recognized on the basis of the sensing information; and
- use the driving path having a lowest degree of risk and the target speed information as input data for a second artificial neural network to determine steering angle information for the autonomous vehicle to control a steering angle of the autonomous vehicle,
- wherein the processor is configured to:
- extract a feature vector by using the sensing data as input data of a convolution neural network (CNN)-based feature extraction algorithm; and
- while using the feature vector, the target speed information, the driving intention information, and a noise vector as input data of a recurrent neural network (RNN)-based path generation algorithm, repeatedly vary the noise vector to generate the plurality of driving paths.

12. The system of claim 11, wherein the processor is configured to:
- input a $I^{st}$ position in a driving path and a hidden state vector corresponding to the $I^{st}$ position as input data of the RNN-based path generation algorithm;
- acquire an $I+1^{st}$ position in the driving path on the basis of an $I+1^{st}$ hidden state vector acquired as an output for the input and the feature vector; and
- repeatedly vary the noise vector with respect to the driving path to generate the plurality of driving paths.

13. The system of claim 11, wherein the processor is configured to:
- collect pieces of training-purpose sensing data for the first and second artificial neural networks during actual driving of a user from the sensing module of the autonomous vehicle or a learning data collecting vehicle;
- assign each of the pieces of collected training-purpose sensing data with a corresponding piece of driving state information of the autonomous vehicle;
- construct training data using each of the pieces of training-purpose sensing data assigned with the driving state information; and
- train the first and second artificial neural networks on the basis of the training data,
- wherein the training data includes the training-purpose sensing data, speed information, true value driving intention information, true value steering angle information, and actual path information for a time t.

14. The system of claim 13, wherein the processor is configured to:
- calculate a transformation matrix using a yaw value, a pitch value, a roll value, a height value, and a latitude and longitude value of the autonomous vehicle or the learning data collecting vehicle acquired from the training-purpose sensing data;
- convert a global position of the autonomous vehicle or the learning data collecting vehicle after the time t into an egocentric coordinate system using the transformation matrix; and
- acquire the actual path information on the basis of the converted egocentric coordinate system.

15. The system of claim 14, wherein the processor is configured to:
- for each position in the actual path information, detect a corresponding shortest position for the autonomous vehicle or the learning data collecting vehicle in each piece of the training-purpose sensing data assigned with the driving state information;
- acquire the driving state information corresponding to the detected position as the driving intention information in the actual path information; and
- select the true value driving intention information that represents the actual path information among pieces of driving intention information of the actual path information.

16. The system of claim 15, wherein the processor is configured to select a maximum number of pieces of driving intention information among L pieces of driving intention information in the actual path information or driving intention information at a last position as the true value driving intention information.

17. A system for generating and controlling a driving path in an autonomous vehicle, the system comprising:
- at least one sensing module coupled to the autonomous vehicle and configured to acquire sensing data for an outside of the autonomous vehicle;
- a memory in which a program for generating a plurality of driving paths for the autonomous vehicle on the basis of the sensing data and determining steering angle information corresponding to one of the generated plurality of driving paths is stored; and
- a processor configured to execute the program stored in the memory,
- wherein the processor executes the program to:
- use the sensing data, driving intention information set and target speed information as input data for a first artificial neural network to generate a plurality of driving paths corresponding to the driving intention information; and
- evaluate a degree of risk of each of the plurality of driving paths from object information recognized on the basis of the sensing information; and
- use the driving path having a lowest degree of risk and the target speed information as input data for a second artificial neural network to determine steering angle information for the autonomous vehicle to control a steering angle of the autonomous vehicle,
- wherein the processor is configured to:
- set the target speed information as an initial hidden state vector of the second artificial neural network based on a recurrent neural network (RNN), sequentially input each position in an actual path information and a hidden state vector corresponding to each position to the second artificial neural network, acquire a hidden state vector at an end of the second artificial neural network as steering angle information, and train the second artificial neural network to reduce an error between the acquired steering angle information and a true value steering angle information.

\* \* \* \* \*